W. H. SCHULTE.
FLOAT VALVE.
APPLICATION FILED SEPT. 30, 1911.
1,059,490.
Patented Apr. 22, 1913.
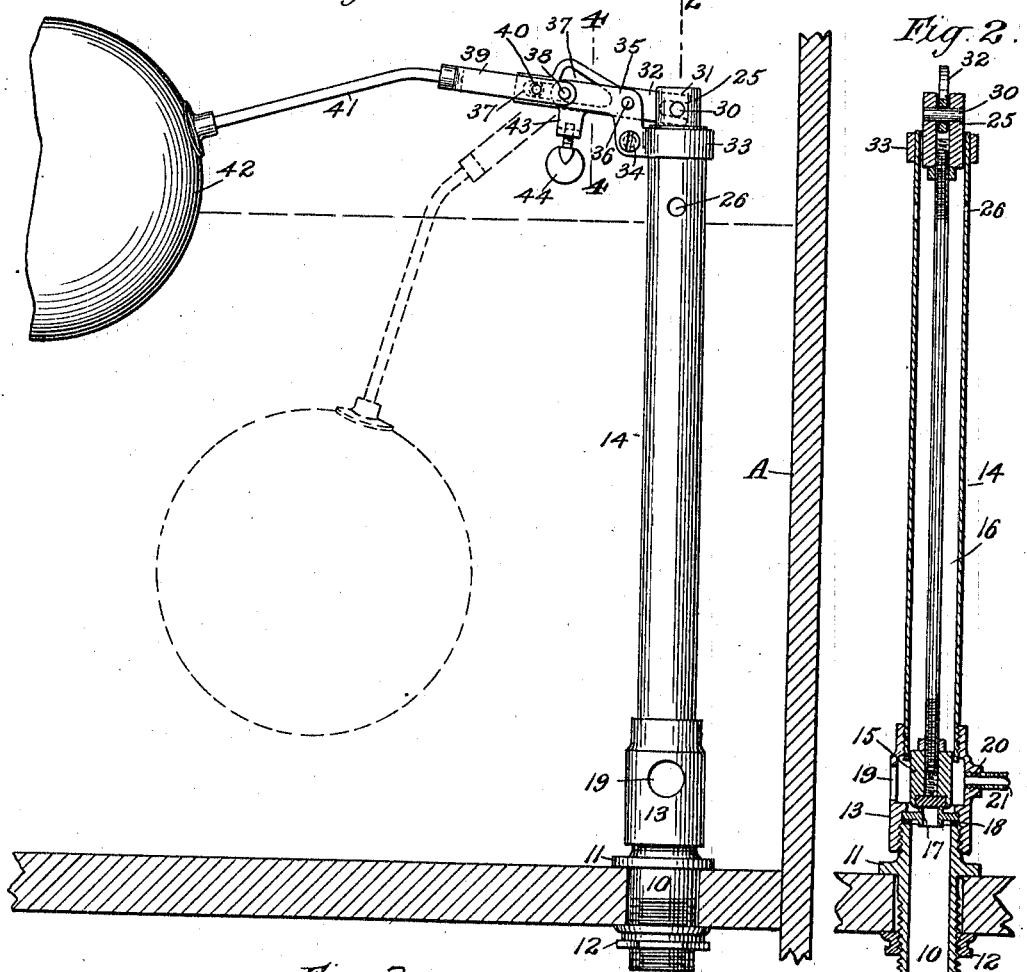
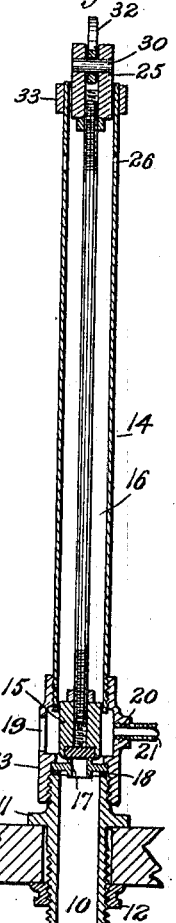
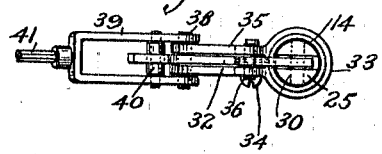
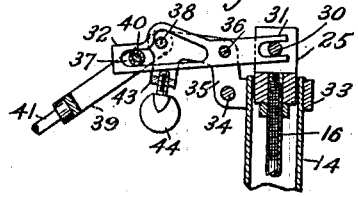
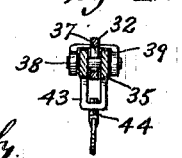
Witnesses:
Inventor:
William H. Schulte
by his Attys:

UNITED STATES PATENT OFFICE.

WILLIAM H. SCHULTE, OF TRENTON, NEW JERSEY.

FLOAT-VALVE.

1,059,490.

Specification of Letters Patent.   Patented Apr. 22, 1913.

Application filed September 30, 1911. Serial No. 652,168.

*To all whom it may concern:*

Be it known that I, WILLIAM H. SCHULTE, a citizen of the United States, residing at Trenton, county of Mercer, and State of New Jersey, have invented certain new and useful Improvements in Float-Valves, fully described and represented in the following specification and the accompanying drawings, forming a part of the same.

This invention relates to certain improvements in float valves for flushing tanks, and lever mechanism for operating the same.

It is the object of the invention to provide an automatic valve which shall be simple in construction, and the lever mechanism for operating which is so arranged as to obtain a large leverage at the point of closing and of opening, so as to easily start the valve in opening and render it certain of closing, in combination with a quick action and large movement of the valve. A construction for effecting these objects is shown in the accompanying drawings, to which reference may be had in connection with the following description for a complete understanding of the invention.

In these drawings—Figure 1 is a side view of an improved float valve operating mechanism with float attached, the parts being shown positioned in a flushing tank which is shown in section, and partly broken away and with the valve closed, the position of the float with the valve open being shown in dotted lines. Fig. 2 is a vertical section taken on line 2—2 of Fig. 1, showing the preferred construction of valve; Fig. 3 is a top view of the valve operating mechanism showing the connection to the valve spindle; Fig. 4 is a detail section taken on line 4—4 of Fig. 1, and Fig. 5 is a detail, partially in section, of the lever mechanism for operating the valve, the parts being shown in the position assumed when the valve is open.

Referring now to these drawings, the valve and operating mechanism therefor is shown as mounted in a flushing tank A of any suitable or usual construction. The inlet pipe 10 passes through the bottom of the tank and is provided with a flange 11 adapted to bear against the inside bottom of the tank. Suppy pipe 10, where it passes through the tank, is threaded and provided with a nut 12 by screwing up which the flange 11 is drawn against the bottom of the tank forming a tight connection. The end of the pipe 10 projects into the tank, and above the flange 11 is threaded and has screwed thereon a fitting 13 which has screwed therein at its upper end a tubular member or sleeve 14. The valve 15 is secured on the lower end of a valve spindle 16 and seats on a valve seat 17 on the end of the inlet pipe 10, a washer 18 being provided between the valve seat 17 and the end of the pipe. This construction is a desirable one as by it the valve seat is readily accessible and removable.

The fitting 13 is provided with a delivery opening 19 and on the opposite end is or may be provided with a boss 20 into which may be secured, if desired, an afterflow 21. At its upper end the valve spindle is screwed or otherwise suitably secured in a fitting 25. In the best constructions and as shown the valve sleeve is provided above the valve with pressure relieving means, these means acting to release any liquid under pressure passing up into member 14 past the loose valve 15, which otherwise might be forced out of the top of the sleeve. In the particular construction illustrated, these pressure relieving means comprise suitable apertures 26 in the walls of the member 14, through which such pressure liquid will be discharged into the tank.

The lever mechanism for operating the valve may be variously constructed and supported. It will, however, be of such character as before indicated as to provide a large leverage at the point of closing and opening and so as to start the valve in opening and render its closing very effective. Preferably, furthermore, this lever mechanism will be so supported that the relation of the valve to the float may be adjusted readily and simply.

In the construction illustrated, the fitting 25 before referred to, in which the upper end of the valve spindle is mounted, is provided with a pin 30 on which works the forked end 31 of a lever 32, this lever 32 operating the valve spindle. This lever 32 and the other parts of the lever mechanism hereinafter described are carried so that the relation of the valve to the float may be adjusted easily and accurately, and to this end there is provided a split band 33 encircling the top of the valve sleeve, this split band being adjustable vertically on the sleeve, suitable means, as screw 34, being provided for tightening the band about the sleeve. On this band 33 are supported the various operating parts of the lever mechanism for operating the valve. In the preferred construction, and as shown, the ends of the split band 33 are extended outwardly from the sleeve forming extensions 35 which form a support. The lever 32 before referred to is pivoted in this support at 36. The end of this lever opposite the end secured to the valve spindle is provided with a slot 37. Pivoted at 38 in the extensions 35 is one end of a forked lever 39. Between the forked ends of the lever 39 is so mounted a pin 40 as to lie in the slot 37 of lever 32 before referred to. The other end of lever arm 39 is suitably connected by a head rod 41 to a float 42. To limit the downward movement of the float, the support is provided with a bracket 43 in which is located a suitable stop, as set screw 44, this set screw bearing against the underside of lever 32 as shown in Fig. 5.

With the construction described, it is obvious that a very effective and certain opening and closing of the valve is secured, the pin working in the slot of the valve spindle lever affording a maximum leverage at the point of opening and closing. While the detail construction shown has been found particularly effective for the purpose for which it is designed, it will be understood that certain changes and variations may be made in it without departing from the invention.

What I claim is:—

1. The combination of a tubular member, a support adjustable on the said member, a valve spindle, a lever arm connected at one end with the valve spindle, pivoted in the support and provided with a slot at its opposite end, and a second lever pivoted on the support and having a pin working in the slot of the first lever to vary the leverage during the valve movement, the second lever at the end opposite the pin being connected with a float.

2. In a float valve, the combination with the valve and valve spindle, of a lever arm pivoted in a fixed support and connected at one end with the valve spindle and provided with a slot in its opposite end, and a second lever pivoted on the support and having a pin working in the slot of the first lever to vary the leverage during the valve movement, and connected at the end opposite the pin with a float.

3. The combination of a tubular member, a support on said member, a valve spindle, a lever pivoted in the support and connected at one end with the valve spindle and provided with a slot at its opposite end, and a second lever having a pin mounted to work in the slot in the first lever to vary the leverage during the valve movement, and connected at the end opposite the pin with a float.

4. The combination of a tubular member, a split ring encircling said member at the top, the ends of the ring being extended to form a support, a valve spindle, a lever arm connected at one end with the valve spindle and pivoted in the support, a slot in the opposite end of the lever, and a second lever provided with a pin and pivoted so that the pin works in the slot of the first lever to vary the leverage during the valve movement.

In testimony whereof, I have hereunto set my hand, in the presence of two subscribing witnesses.

WILLIAM H. SCHULTE.

Witnesses:
J. A. GRAVES,
W. H. KENNEDY.

---

Copies of this patent may be obtained for five cents each, by addressing the "Commissioner of Patents, Washington, D. C."